No. 662,889. Patented Nov. 27, 1900.
M. SWENSON & H. S. RINGI.
COTTON PRESS.
(Application filed Feb. 24, 1900.)
(No Model.) 2 Sheets—Sheet 1.
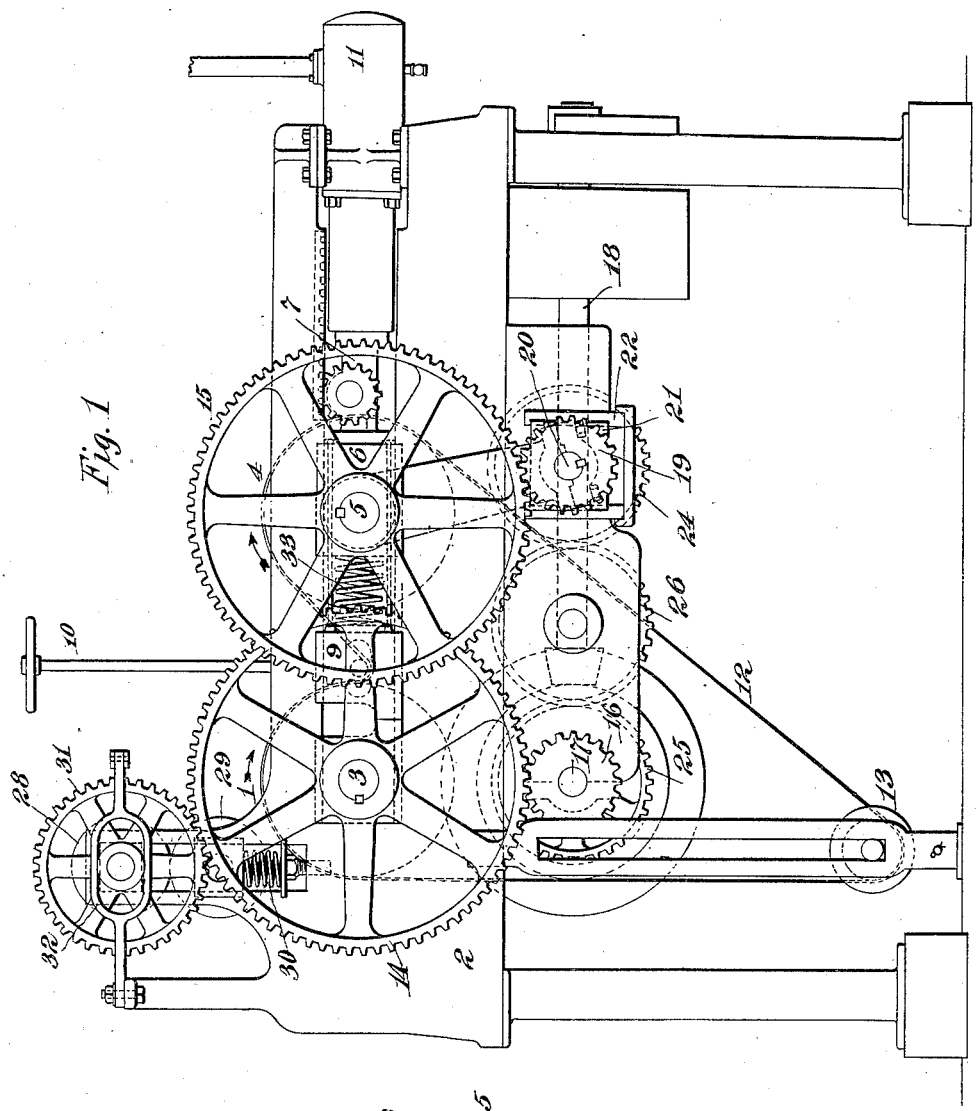

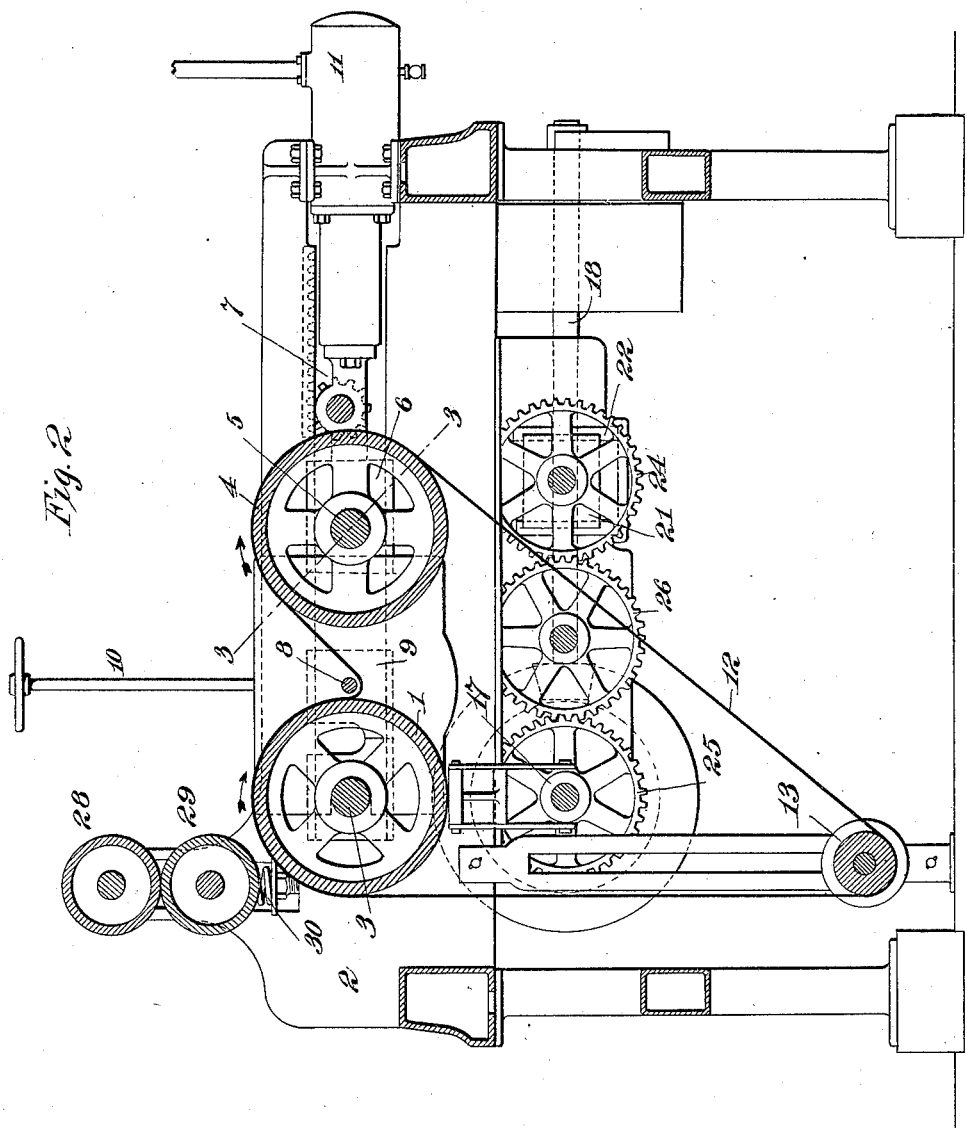

UNITED STATES PATENT OFFICE.

MAGNUS SWENSON, OF CHICAGO, AND HAAKON S. RINGI, OF CHICAGO HEIGHTS, ILLINOIS, ASSIGNORS TO THE AMERICAN COTTON COMPANY, OF NEW YORK, N. Y.

COTTON-PRESS.

SPECIFICATION forming part of Letters Patent No. 662,889, dated November 27, 1900.

Application filed February 24, 1900. Serial No. 6,369. (No model.)

*To all whom it may concern:*

Be it known that we, MAGNUS SWENSON, residing at Chicago, and HAAKON S. RINGI, residing at Chicago Heights, in the county of Cook and State of Illinois, citizens of the United States, have invented a certain new and useful Improvement in Cotton-Presses, of which the following is a description.

Our invention relates to improvements in cotton-presses of the type described in the patent to Swenson, No. 633,708, dated September 26, 1899. In the press of the said patent a pair of baling-rolls are mounted in a horizontal plane, one being stationary and the other bodily movable, and an endless belt being employed which passes partly around both rolls and beneath a core on which the bale is formed. It has been found in practice that where the belt passes around the bale in process of formation it becomes more or less embedded in the cotton, which cotton will be caught between the belt and the baling-roll onto which it runs and will be pulled out of the bale. This waste is not only expensive, but is objectionable, as the cotton so drawn out of the bale is liable to interfere with the working parts of the press.

The principal object of our invention is to prevent the occurrence of this waste, which object we effect by rounding the edges of the baling-roll onto which the belt runs, so that the cotton cannot be gripped between the belt and the baling-roll, and will hence not be drawn out of the bale in process of formation.

In the patented press a compression-roller was mounted to press upon the belt to force it tightly into engagement with the surface of the stationary baling-roll, and it often happened in the operation that the bale in process of formation slipped relatively to the belt, so that a fold would occur between the bale and the compression-roller, which was objectionable in practice, as it prevented the bale from unwinding smoothly.

Another object of our invention is to provide means for overcoming this defect, which object we accomplish by employing preferably a pair of compression-rollers, between which the bat is fed before entering the press, and employing a clutch for stopping the said rollers when desired, so that if a fold is formed in the sheet or bat between the rollers and the bale the compression-rollers may be stopped and the fold be permitted to be taken up by the rotation of the bale.

In order that the invention may be better understood, attention is directed to the accompanying drawings, forming a part of this specification, and in which—

Figure 1 is a side elevation of a cotton-press of the type described in the said patent to Swenson, showing our present improvements applied thereto; Fig. 2, a longitudinal section of the same, and Fig. 3 a cross-sectional view on the line 3 3 of Fig. 2.

In all of the above views corresponding parts are represented by the same numerals reference.

1 is a baling-roll mounted in fixed bearings in a suitable frame 2 on a shaft 3.

4 is a baling-roll, the shaft 5 of which is carried in bearing-boxes 6 6, working in guides 7 in the side frames.

8 represents a core removably carried in bearing-boxes 9, working also in the guides 7 7. A hand-wheel 10 may be employed to operate the usual devices for freeing the ends of the core when it is desired to remove the bale.

11 is a hydraulic cylinder the piston of which is connected to the bearings of the movable roll 4 and by which pressure on the forming bale will be produced.

12 is an endless belt which passes around the baling-rolls 1 and 4 below the core 8 and around an idler 13.

14 and 15 are spur-gears keyed to the shafts of the baling-rolls, said gears preferably overlapping, as shown. The gear 14 is driven by pinion 16 on a fixed counter-shaft 17, driven from the main shaft 18 through bevel-gearing, as indicated in dotted lines. A pinion 19 meshes with and drives the spur-gear 15, said pinion being carried on a sliding counter-shaft 20, mounted in bearings 21, working in the vertical guides 22.

All of the parts which have been already described correspond to the construction of press described in said patent.

In order to prevent cotton from being drawn out of the bale by reason of the fact that the belt becomes impressed below the surface thereof, we form the baling-roll 4 with rounded edges 23, as shown in Fig. 3, whereby the portion of the belt adjacent to its edges will not be engaged by the rounded portion of the baling-roll 4, and in consequence any cotton which may overlap the belt will not be pinched between the belt and the baling-roll and be drawn out of the bale, as will happen if the rounded edges are not employed.

In order that the sprocket-chain of the driving mechanism described in said patent may be dispensed with, we mount on the sliding counter-shaft 20 a gear 24, and we carry on the fixed counter-shaft 17 a gear 25. 26 is an idler which meshes with said gears. A clutch 27 may be employed to connect the pinion 16 or to disconnect it from the fixed counter-shaft 17, whereby rotation of the baling-roll 1 may be arrested to allow the rotation of the baling-roll 4 to straighten out the loop in the belt when it is desired to remove the bale, as explained in said patent.

Instead of employing a single compression-roller which presses against the belt and tightly compresses the cotton between it and the belt before reaching the bale we employ a pair of compression-rollers 28 and 29, forced elastically together by means of a buffer 30, as is common. The shaft of the upper compression-roller 29 carries a gear 31, which meshes with and is driven from the gear 14. A clutch 32 of any suitable construction is employed to disconnect the gear 31, so as to stop the rotation of the compression-rollers when desired. If, therefore, in the baling operation the belt should slip relatively to the bale so as to tend to form a fold in the sheet or bat between the compression-rollers and the bale, the clutch 32 may be operated to stop the compression-rollers and permit the bale in its rotation to take up the fold, whereupon the compression-rollers will be again started to feed the sheet or bat to the bale.

In the making of cylindrical bales it is desirable that the inner layers of the sheet or bat should be subjected to comparatively light pressure in order that there may be no danger of the cotton becoming matted or caked together at the center. With our present improvements we so dispose the baling-rolls 1 and 4 to each other that when at their innermost positions they will be separated to a considerable extent, as shown in Fig. 2. We also preferably interpose between the bearing-box 9 for the core and the bearing-box 6 of the baling-roll 4 at each side of the machine a spring or buffer 33, which elastically forces the core and the belt over into contact or into substantial contact with the baling-roll 1, as shown. With this construction, therefore, the accumulation of the cotton around the core will result, first, in the movement of the core toward the baling-roll 4, during which movement the cotton will be subjected to the pressure of the springs 33 and of the belt, and after sufficient cotton has been thus accumulated to force the belt against the baling-roll 4 the further accumulation of cotton will commence to force the baling-roll 4 in its outward travel and pressure on the bale will be imposed by the pressure-producing devices in the usual way.

Having now described our invention, what we claim as new therein, and desire to secure by Letters Patent, is as follows:

1. In a cotton-press of the character described, the combination with two baling-rolls, a core between them, and means for operating said rolls, of a pair of compression-rollers adjacent to the baling-rolls and between which the sheet or bat is passed before being fed to the core, connections between said compression-rollers and the baling-rolls for driving said compression-rollers, and a clutch in such connections for stopping the compression-rollers without arresting the rotation of the baling-rolls, substantially as set forth.

2. In a cotton-press of the type described, the combination of an endless belt having a loop or bight in which the bale is formed, and a baling-roll over which the belt passes, said baling-roll being provided with curved or rounded surfaces coincident with the edges of the belt, substantially as set forth.

3. In a cotton-press, the combination of a pair of baling-rolls mounted in the same plane, one of said rolls having curved or rounded edges, a core mounted between said baling-rolls, and a belt passing over the rolls and adjacent to the core, the edges of said belt being located coincident with the curved or rounded surfaces of the baling-roll, substantially as set forth.

MAGNUS SWENSON.
HAAKON S. RINGI.

In presence of—
B. A. JOHNSTON,
JAS. H. GIBSON.